(12) United States Patent
Mu

(10) Patent No.: US 9,207,872 B2
(45) Date of Patent: *Dec. 8, 2015

(54) REMOTE OFFICE DUPLICATION

(71) Applicant: NetApp Inc., Sunnyvale, CA (US)

(72) Inventor: Yuedong Paul Mu, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,557

(22) Filed: Dec. 9, 2013

(65) Prior Publication Data
US 2014/0101398 A1 Apr. 10, 2014

Related U.S. Application Data

(63) Continuation of application No. 13/305,335, filed on Nov. 28, 2011, now Pat. No. 8,606,753, which is a continuation of application No. 12/263,371, filed on Oct. 31, 2008, now Pat. No. 8,082,228.

(51) Int. Cl.
| G06F 7/00 | (2006.01) |
| G06F 17/00 | (2006.01) |
| G06F 3/06 | (2006.01) |
| G06F 11/14 | (2006.01) |

(52) U.S. Cl.
CPC ............. *G06F 3/0641* (2013.01); *G06F 3/067* (2013.01); *G06F 3/0619* (2013.01); *G06F 11/1453* (2013.01); *G06F 11/1464* (2013.01); *G06F 2201/84* (2013.01)

(58) Field of Classification Search
CPC .......... G06F 11/1453; G06F 17/30156; G06F 3/0641
USPC ........................................................ 707/650
See application file for complete search history.

(56) References Cited

U.S. PATENT DOCUMENTS

| 7,761,425 | B1 * | 7/2010 | Erickson | G06F 11/1453 707/649 |
| 8,180,740 | B1 | 5/2012 | Stager et al. | |
| 8,200,638 | B1 | 6/2012 | Zheng et al. | |
| 8,229,896 | B1 | 7/2012 | Narayanan | |
| 8,352,692 | B1 * | 1/2013 | Jordan | H04L 67/1093 711/162 |
| 2002/0161913 | A1 * | 10/2002 | Gonzalez | H04L 29/06 709/233 |
| 2005/0086241 | A1 | 4/2005 | Ram et al. | |
| 2006/0218644 | A1 | 9/2006 | Niles et al. | |
| 2009/0049260 | A1 | 2/2009 | Upadhyayula | |
| 2009/0089630 | A1 * | 4/2009 | Goldenberg | G06F 17/30536 714/704 |
| 2009/0228599 | A1 * | 9/2009 | Anglin | G06F 3/0608 709/231 |
| 2009/0323527 | A1 * | 12/2009 | Accapadi | H04L 1/1841 370/235 |
| 2013/0151472 | A1 | 6/2013 | Niles et al. | |
| 2013/0246366 | A1 | 9/2013 | Preslan et al. | |

OTHER PUBLICATIONS

Notice of Allowance issued for co-pending U.S. Appl. No. 13/942,461, mailed Jun. 15, 2015, 9 pages.

* cited by examiner

*Primary Examiner* — Binh V Ho
(74) *Attorney, Agent, or Firm* — Cooper Legal Group, LLC

(57) ABSTRACT

Remote office deduplication comprises calculating one or more fingerprints of one or more data blocks, sending the one or more fingerprints to one or more backup servers via a network interface, receiving from the one or more backup servers an indication of which one or more data blocks corresponding to the one or more fingerprints should be sent to the one or more backup servers, and if the indication indicates one or more data blocks to be sent to the one or more backup servers, sending the one or more data blocks to the one or more backup servers via the network interface.

17 Claims, 13 Drawing Sheets

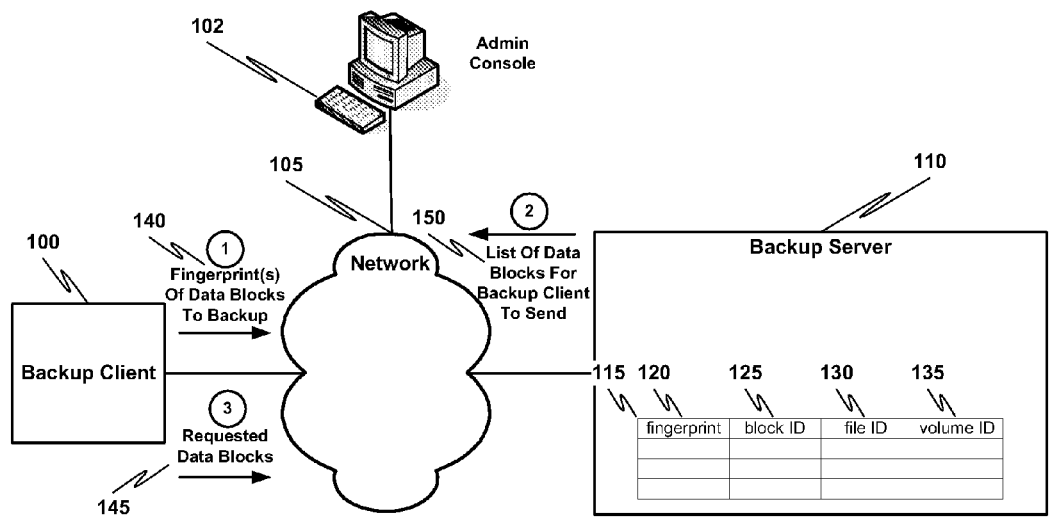
FIG.1A
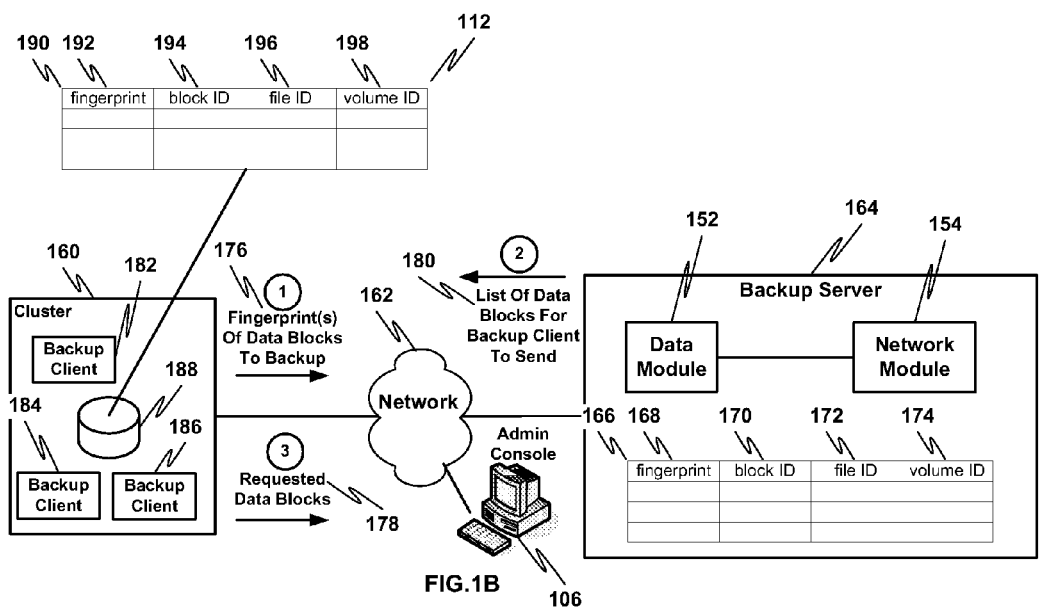
FIG.1B
FIG. 1

REMOTE OFFICE DUPLICATION

RELATED APPLICATIONS

This patent application claims benefit to and is a continuation of the U.S. patent application entitled "REMOTE OFFICE DUPLICATION," having Ser. No. 13/305,335 filed on Nov. 28, 2011, now U.S. Pat. No. 8,606,753, which is a continuation of U.S. patent application entitled "REMOTE OFFICE DUPLICATION," having Ser. No. 12/263,371 filed on Oct. 31, 2008, now U.S. Pat. No. 8,082,228, both of which are expressly incorporated herein by reference.

FIELD OF THE INVENTION

The present invention relates to the field of computer science. More particularly, the present invention relates to remote office deduplication.

BACKGROUND OF THE INVENTION

Various forms of network storage systems exist today, including network attached storage (NAS), storage area networks (SANs), and others. Network storage systems are commonly used for a variety of purposes, such as backing up critical data, providing multiple users with access to shared data, etc.

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures, including, but not limited to, a network-attached storage environment, a storage area network, and a disk assembly directly attached to a client or host computer. The storage devices are typically disk drives organized as a disk array, managed according to a storage protocol, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A., Gibson and R. H. Katz, Proceedings of the International Conference on Management of Data (SIGMOD), June 1998.

The storage operating system of the storage system may implement a high-level module, such as a file system, to logically organize containers for the information. For example, the information may be stored on disks as a hierarchical structure of directories, files, and blocks. Each "on-disk" file may be implemented as a set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although it is not necessarily, associated with its own file system. The file system typically consists of a contiguous range of vbns from zero to n, for a file system of size n+1 blocks.

A network storage system includes at least one storage server, which is a processing system configured to store and retrieve data on behalf of one or more client processing systems ("clients"). In the context of NAS, a storage server is commonly a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID. Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by NetApp Inc. (NetApp®) of Sunnyvale, Calif.

Recently, some storage servers have been designed to have distributed architectures, to facilitate clustering of storage nodes. Clustering facilitates scaling of performance and storage capacity. For example, rather than being implemented in a single box, a storage server may include a separate N-("network") module and D-(disk) module, which are contained within separate housings and communicate with each other via some type of switching fabric or other communication medium. Each D-module typically manages a separate set of disks. Storage servers which implement the Data ONTAP® GX operating system from NetApp can have this type of distributed architecture.

In a large file system, and in networks of file systems such as remote offices connected via a network, it is common to find duplicate occurrences of individual blocks of data. Duplication of data blocks may occur when, for example, two or more files or other data containers share common data or where a given set of data occurs at multiple places within a given file. Duplication of data blocks results in inefficient use of storage space by storing the identical data in a plurality of differing locations served by a storage system. Duplication of data blocks also results in lengthy data transfers between remote offices and a main office via a network, such as to perform data backup and restore operations. In addition, backup agents resident in each of multiple remote offices are typically incapable of communicating with each other efficiently. Accordingly, a need exists for an improved solution for remote office deduplication.

SUMMARY OF THE INVENTION

The present invention overcomes the disadvantages of the prior art by storing a data block fingerprint representing data blocks transferred over a network to another computer as part of a data backup or restore operation. Each fingerprint occupies less storage than the data block it represents. A data block is transferred over the network only if it has not already been transferred over the network, as indicated by the absence of a stored data block fingerprint representing the data block to be transferred. Transferring data blocks over a network only if they have not already been transferred provides more efficient network utilization and decreases the time required to perform a backup or restore operation.

According to an illustrative embodiment of the invention, remote office deduplication comprises calculating one or more fingerprints of one or more data blocks, sending the one or more fingerprints to one or more backup servers via a network interface, receiving from the one or more backup servers an indication of which one or more data blocks corresponding to the one or more fingerprints should be sent to the one or more backup servers, and if the indication indicates one or more data blocks to be sent to the one or more backup servers, sending the one or more data blocks to the one or more backup servers via the network interface.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1A is a block diagram that illustrates an apparatus for remote office deduplication in accordance with one embodiment of the present invention.

FIG. 1B is a block diagram that illustrates an apparatus for remote office deduplication in a clustered environment in accordance with one embodiment of the present invention.

DETAILED DESCRIPTION

Figure 2:
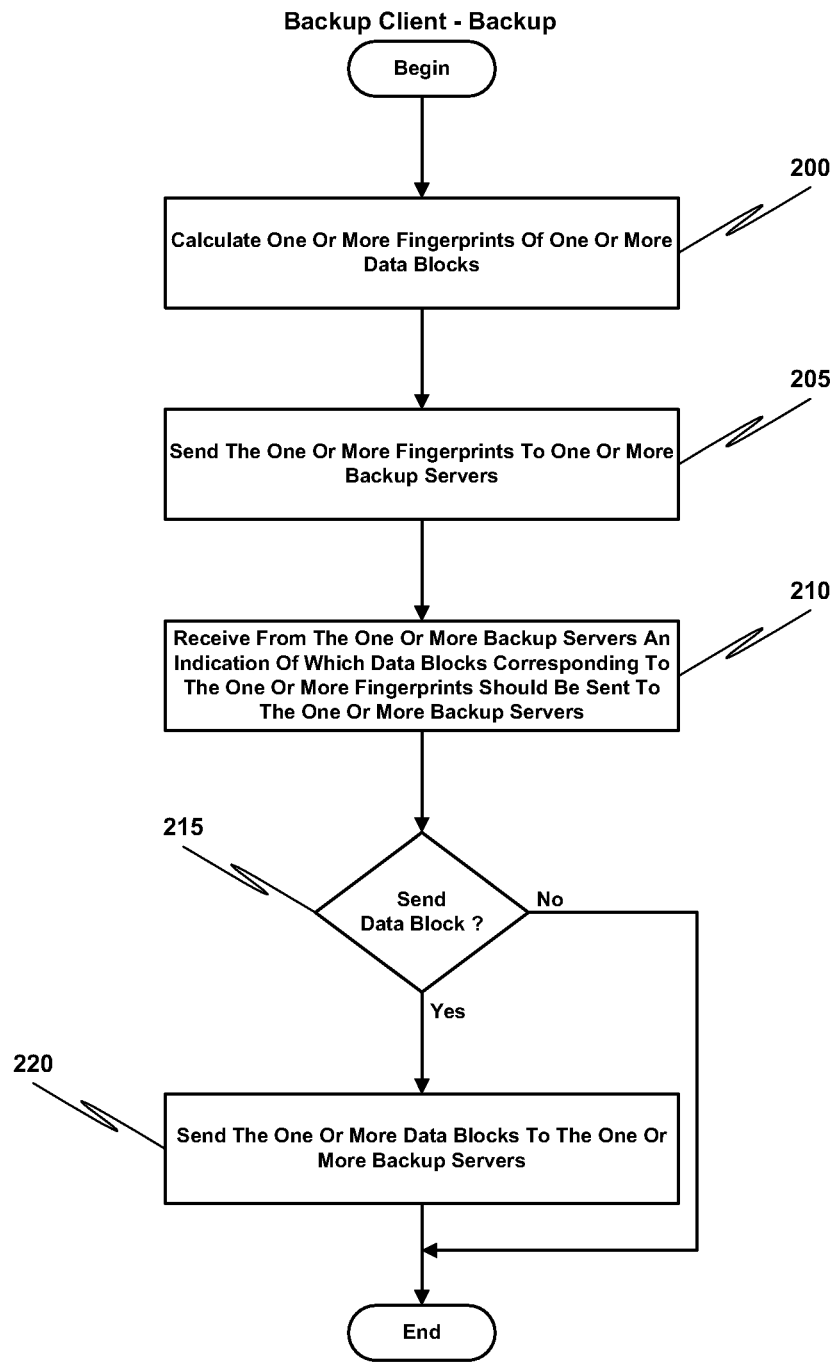
FIG. 2 is a flow diagram that illustrates a method for remote office deduplication backup from the perspective of a backup client in accordance with one embodiment of the present invention.

The disclosure of U.S. patent application entitled "REMOTE OFFICE DUPLICATION," having Ser. No. 12/263,371 filed on Oct. 31, 2008, is expressly incorporated herein by reference.

Embodiments of the present invention are described herein in the context of remote office deduplication. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Example embodiments of the present invention store a data block fingerprint representing data blocks transferred over a network to another computer as part of a data backup or restore operation. Each fingerprint occupies less storage than the data block it represents. A data block is transferred over the network only if it has not already been transferred over the network, as indicated by the absence of a stored data block fingerprint representing the data block to be transferred. Transferring data blocks over a network only if they have not already been transferred provides more efficient network utilization and decreases the time required to perform a backup or restore operation.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "indication" describes a value of a quantity provided by a measuring instrument. The value may be can be represented by one or more bits.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data stores" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "user interface" describes any device or group of devices for presenting and/or receiving information and/or directions to and/or from persons. A user interface may comprise a means to present information to persons, such as a visual display projector or screen, a loudspeaker, a light or system of lights, a printer, a Braille device, a vibrating device, or the like. A user interface may also include a means to receive information or directions from persons, such as one or more or combinations of buttons, keys, levers, switches, knobs, touch pads, touch screens, microphones, speech detectors, motion detectors, cameras, and light detectors. Exemplary user interfaces comprise pagers, mobile phones, desktop computers, laptop computers, handheld and palm computers, personal digital assistants (PDAs), cathode-ray tubes (CRTs), keyboards, keypads, liquid crystal displays (LCDs), control panels, horns, sirens, alarms, printers, speakers, mouse devices, consoles, and speech recognition devices.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

In the context of the present invention, the term "computer cluster" describes a group of computers that operate as if they were a single unit.

In the context of the present invention, the term "backup server" describes one or more processors configured to store a backup copy of data. For example, a backup server may comprise a filer.

In the context of the present invention, the term "fingerprint" describes a hash value or a string of bits resulting from the conversion of processing data to a number. As an example, a fingerprint may comprises a checksum. As a further example, a fingerprint may comprise a CRC (cyclic redundancy code), a message digest, or the like.

Figure 3:
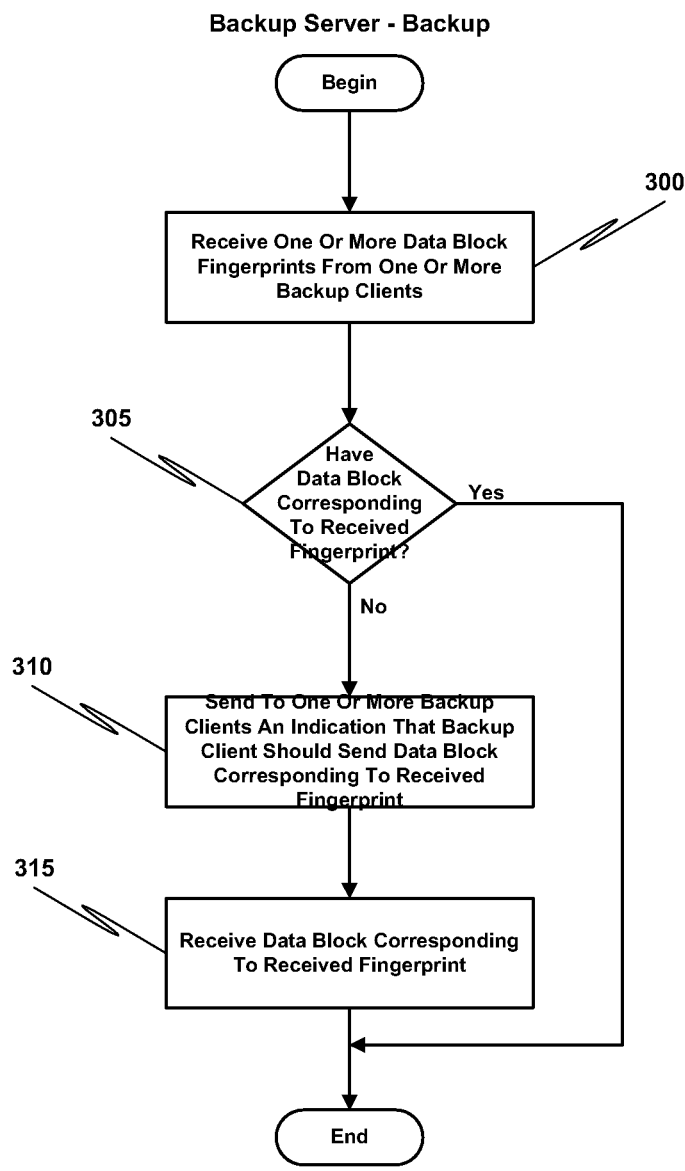
FIG. 3 is a flow diagram that illustrates a method for remote office deduplication backup from the perspective of a backup server in accordance with one embodiment of the present invention.
Figure 4:
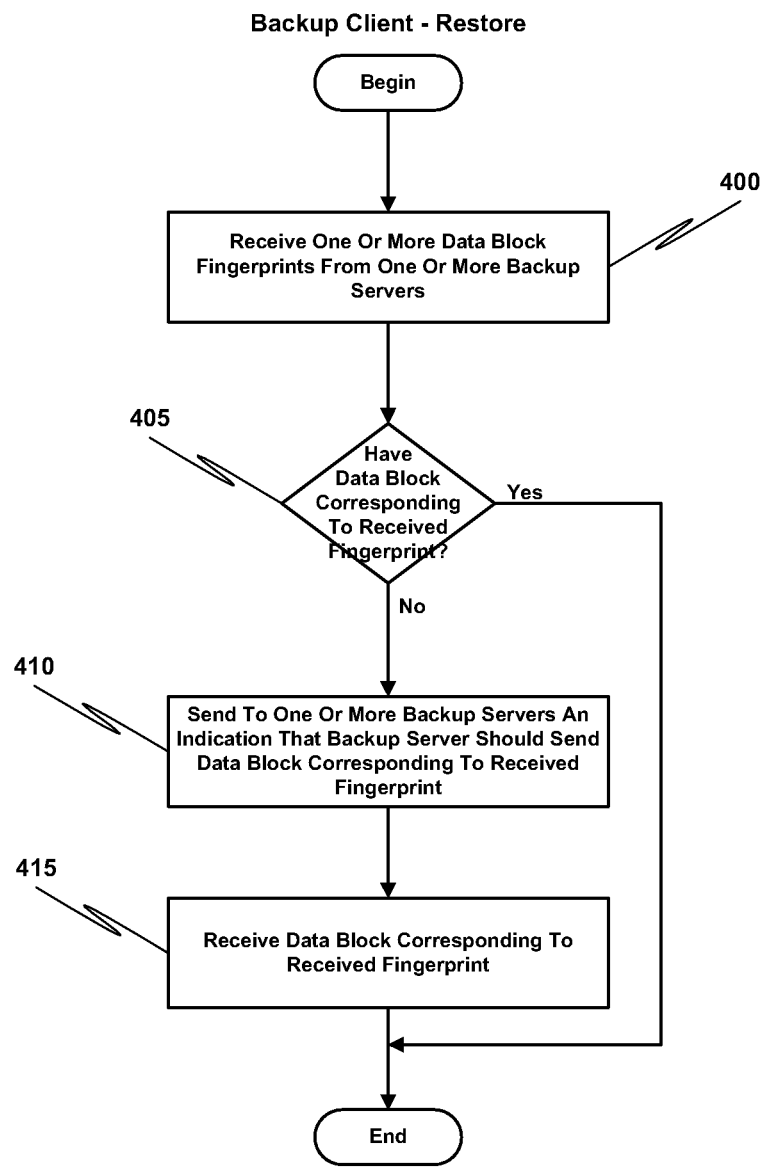
FIG. 4 is a flow diagram that illustrates a method for remote office deduplication restore from the perspective of a backup client in accordance with one embodiment of the present invention.
Figure 5:
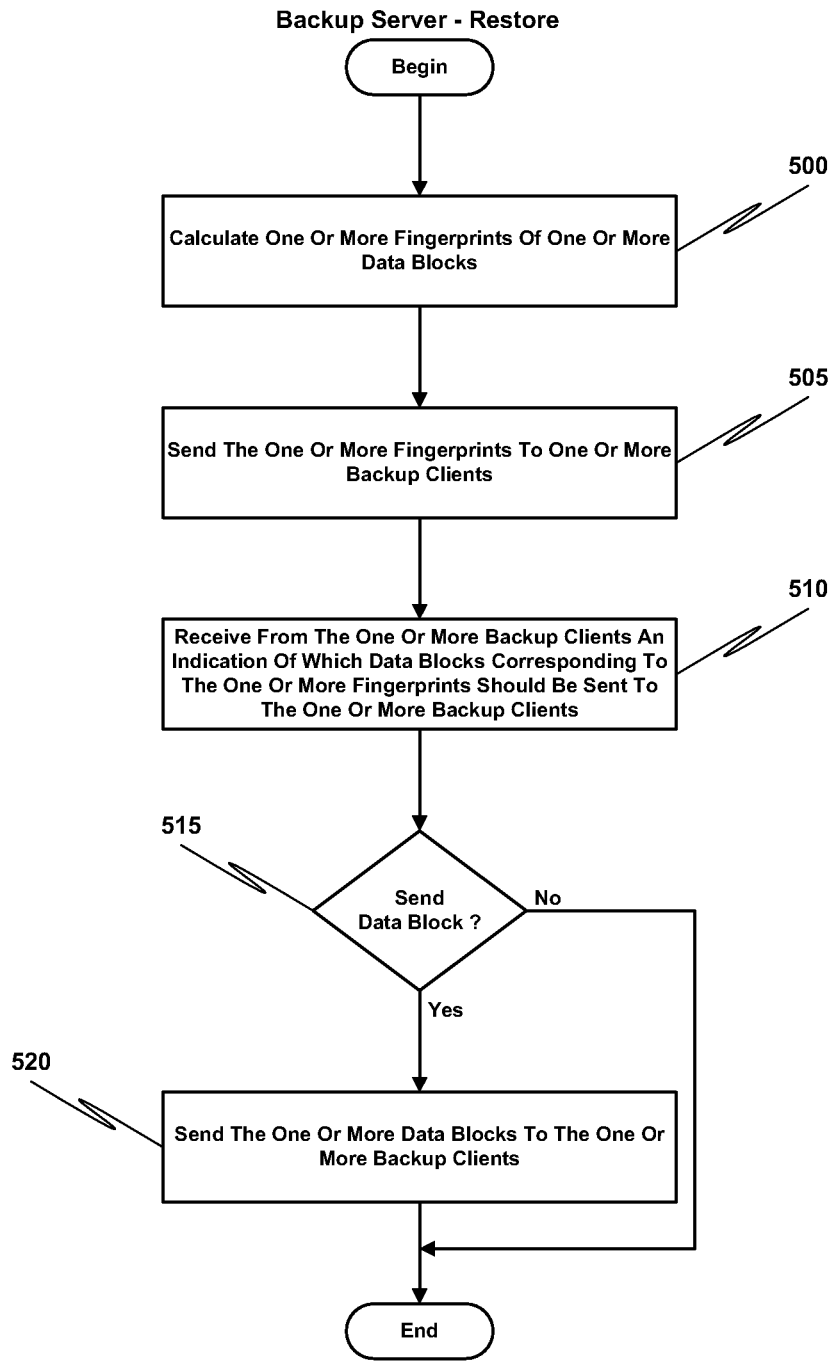
FIG. 5 is a flow diagram that illustrates a method for remote office deduplication restore from the perspective of a backup server in accordance with one embodiment of the present invention.

FIGS. 1A-5 illustrate remote office deduplication using a "smart" receiver or backup server in accordance with one embodiment of the present invention. The receiver or backup server is referred to as "smart" because it maintains a record of the fingerprints corresponding to data blocks it received. FIGS. 1A and 1B illustrates an apparatus suitable for performing the processes illustrated in FIGS. 2-5 and 12. FIGS. 2-3 illustrate performing a backup operation, and FIGS. 4-5 illustrate performing a restore operation.

Figure 6:
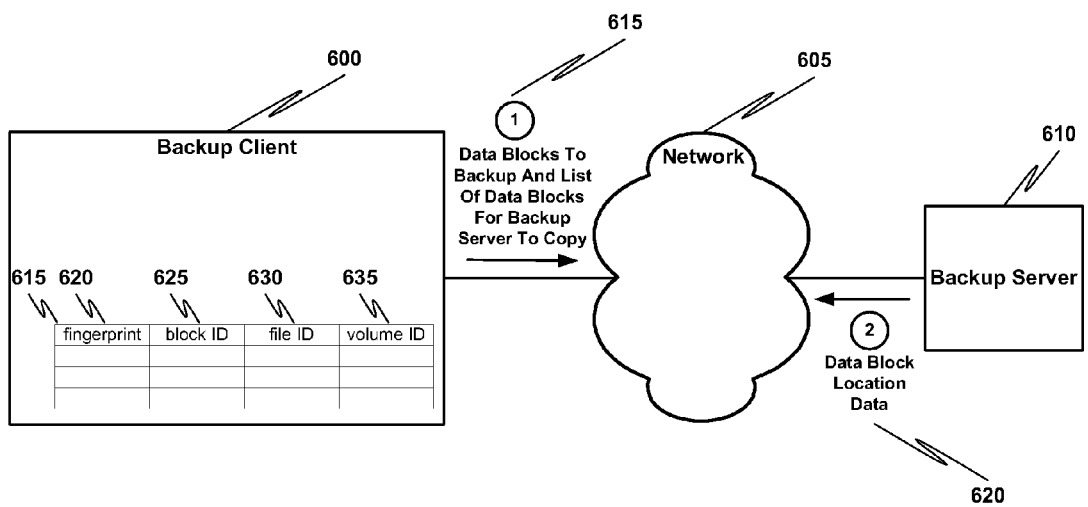
FIG. 6 is a block diagram that illustrates an apparatus for remote office deduplication in accordance with one embodiment of the present invention.
Figure 7:
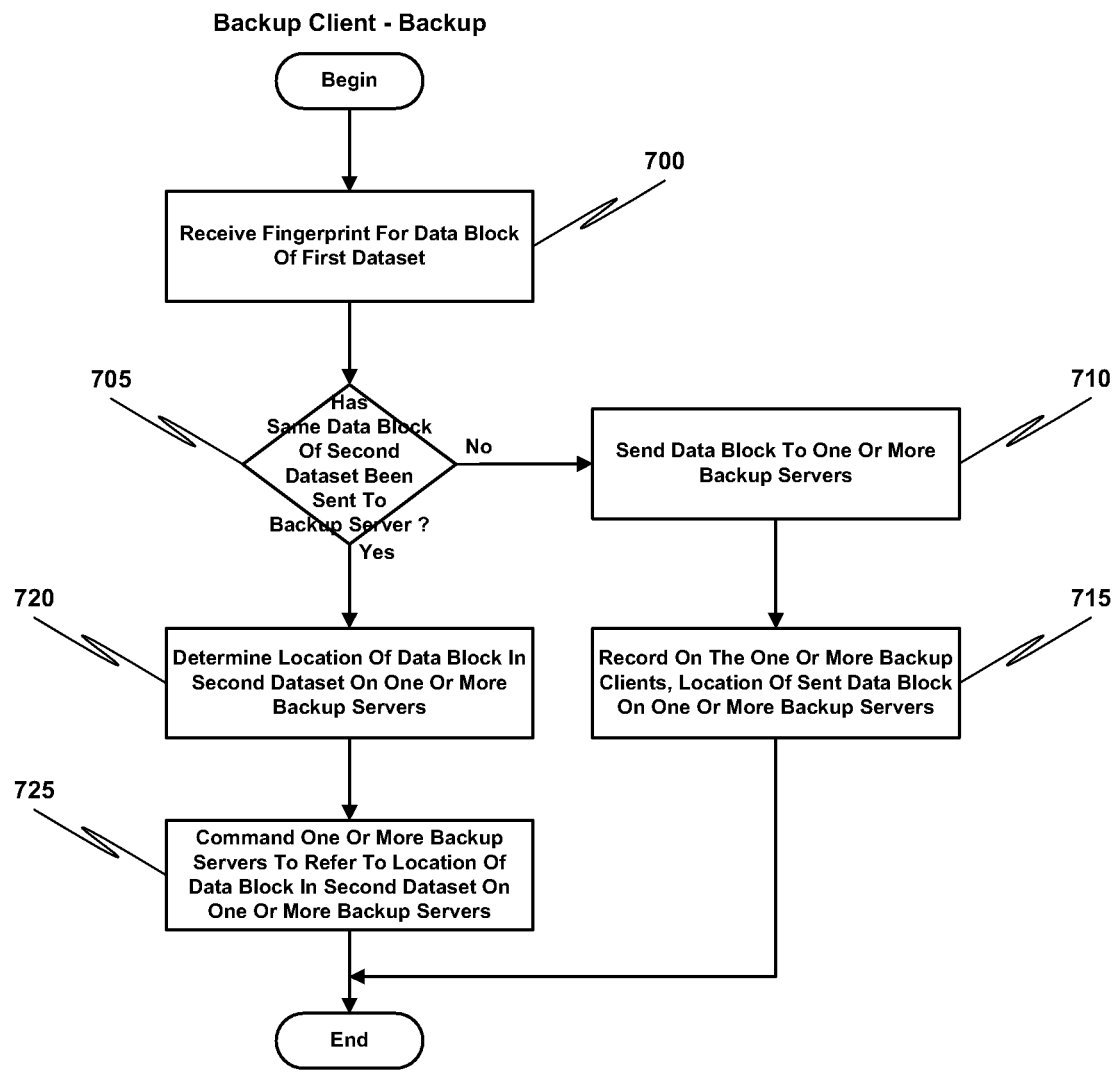
FIG. 7 is a flow diagram that illustrates a method for remote office deduplication backup from the perspective of a backup client in accordance with one embodiment of the present invention.
Figure 8:
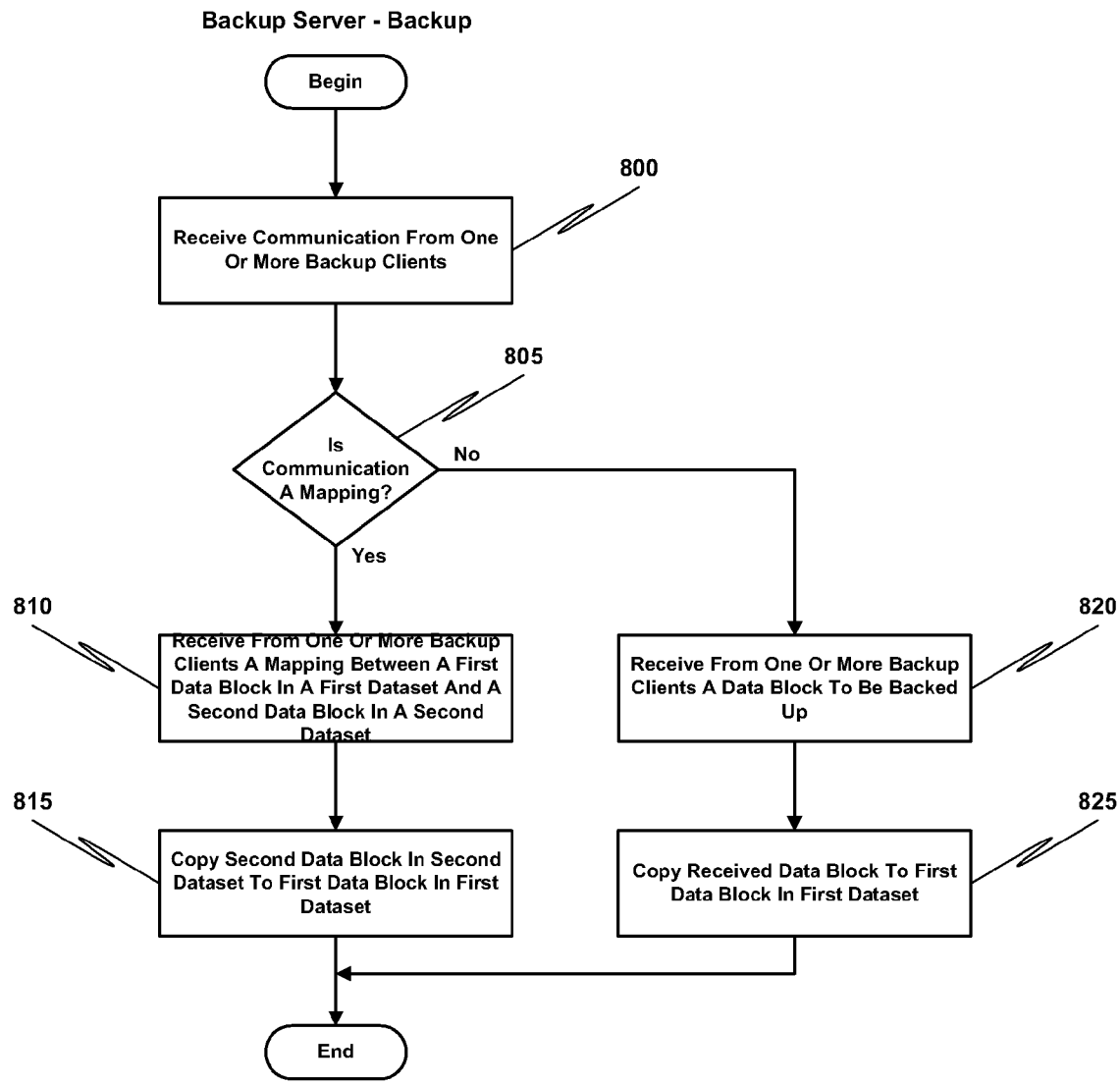
FIG. 8 is a flow diagram that illustrates a method for remote office deduplication backup from the perspective of a backup server in accordance with one embodiment of the present invention.
Figure 9:
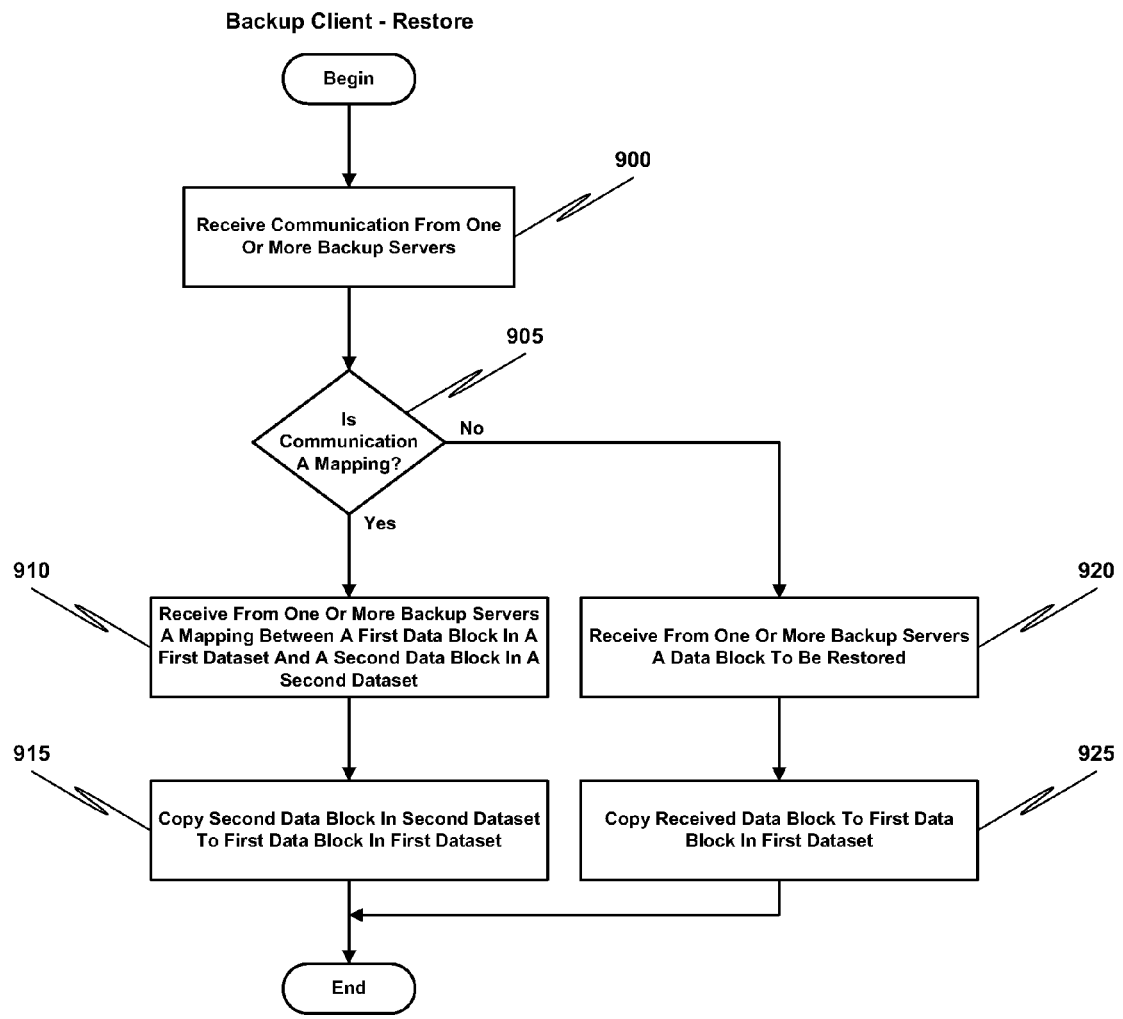
FIG. 9 is a flow diagram that illustrates a method for remote office deduplication restore from the perspective of a backup client in accordance with one embodiment of the present invention.
Figure 10:
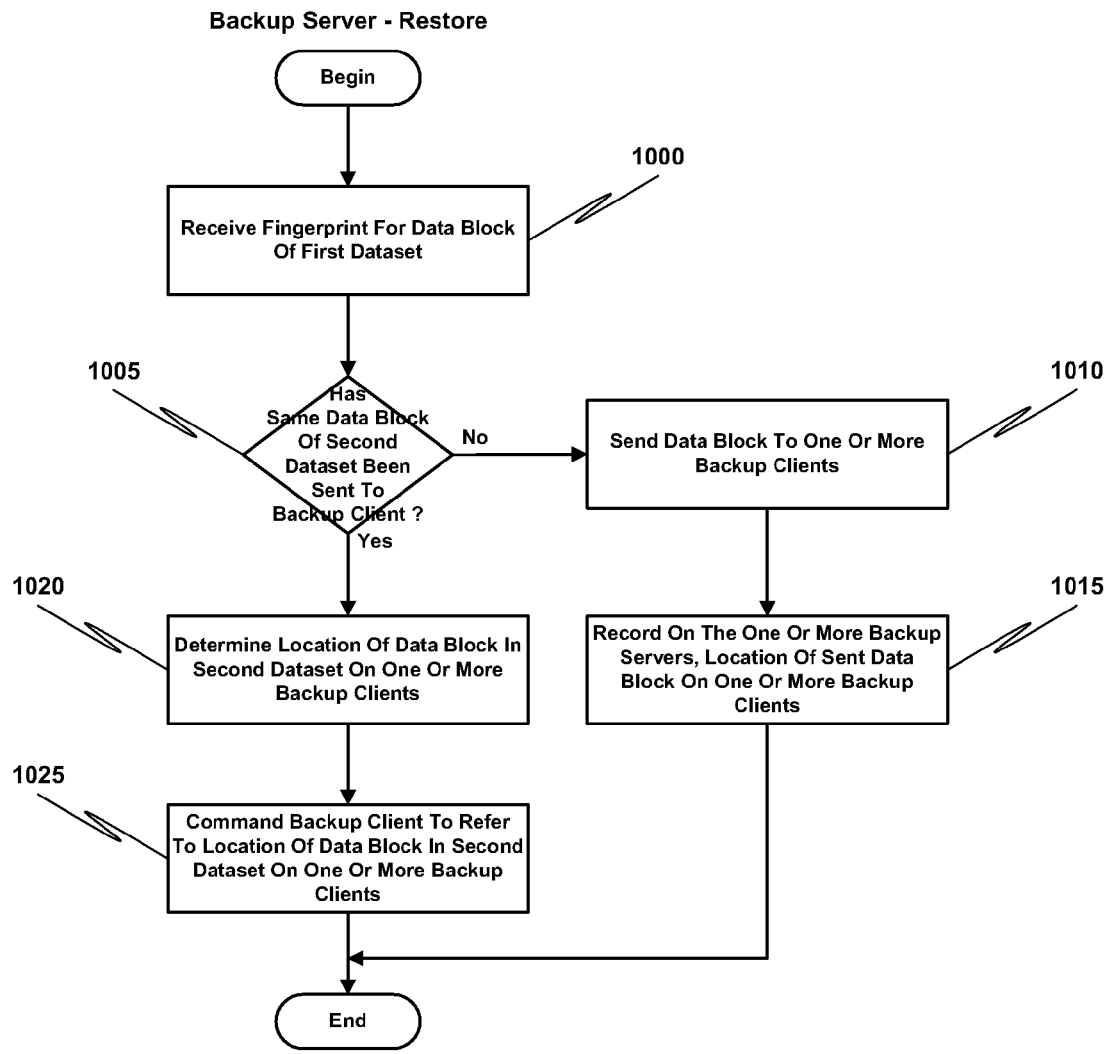
FIG. 10 is a flow diagram that illustrates a method for remote office deduplication restore from the perspective of a backup server in accordance with one embodiment of the present invention.

FIGS. 6-10 illustrate remote office deduplication using a "smart" sender or backup client in accordance with one embodiment of the present invention. The sender or backup client is referred to as "smart" because it maintains a record of the fingerprints corresponding to data blocks it sent. FIG. 6 illustrates an apparatus suitable for performing the processes illustrated in FIGS. 7-10 and 12. FIGS. 7-8 illustrate performing a backup operation, and FIGS. 9-10 illustrate performing a restore operation.

FIG. 1A is a block diagram that illustrates an apparatus for remote office deduplication in accordance with one embodiment of the present invention. As shown in FIG. 1A, an apparatus for remote office deduplication comprises one or more backup clients 100 coupled to one or more backup servers 110 via a network 105. The one or more backup servers 110 comprise a block catalog 115 which maintains a list of fingerprints for data blocks. As shown in FIG. 1A, block catalog 115 comprises, for each data block, a fingerprint 120, a block ID 125, a file ID 130, and a volume ID 135.

The one or more backup clients 100 are configured to calculate one or more fingerprints 140 of one or more data blocks and send the one or more fingerprints to the one or more backup servers 110 via network 105. The one or more backup servers 110 are configured to receive the one or more fingerprints and determine whether the one or more backup servers 110 has one or more data blocks corresponding to the one or more fingerprints. The one or more backup servers 110 are further configured to send to the one or more backup clients 100 an indication of which data blocks corresponding to the one or more fingerprints should be sent to the one or more backup servers 110. For example, the one or more backup servers 110 may send a list of fingerprints, each fingerprint corresponding to a data block that the one or more backup clients 100 should send to the one or more backup servers 110. Alternatively, the one or more backup servers 110 may send a list of fingerprints, each fingerprint corresponding to a data block that the one or more backup servers 110 already has and which the one or more backup clients 100 need not resend. The one or more backup clients 100 are further configured to receive the indication from the one or more backup servers 110 and send one or more data blocks to the one or more backup servers 110 if indicated by the indication. The one or more backup servers 110 are further configured to receive the one or more data blocks sent by the one or more backup clients 100.

In performing a restore operation, the one or more backup clients 100 are configured to receive one or more data block fingerprints from one or more backup servers 110 and, for each received fingerprint, determine whether the one or more backup clients 100 have a data block corresponding to the received fingerprint. The one or more backup clients 100 are further configured to, if the one or more backup clients 100 do not have a data block corresponding to the received fingerprint, send to the one or more backup servers 110 an indication that the one or more backup servers 110 should send the data block corresponding to the received fingerprint, and to receive the data block from the one or more backup servers 110. The one or more backup servers 110 are configured to calculate one or more fingerprints of one or more data blocks, send the one or more fingerprints to the one or more backup clients 100, receive from the one or more backup clients 100 an indication of which data blocks corresponding to the one or more fingerprints should be sent to the one or more backup clients 100, and send data blocks to the one or more backup clients 100 based on the indication. For example, the one or more backup clients 100 may send a list of fingerprints, each fingerprint corresponding to a data block that the one or more backup servers 110 should send to the one or more backup clients 100. Alternatively, the one or more backup clients 100 may send a list of fingerprints, each fingerprint corresponding to a data block that the one or more backup clients 100 already has and which the one or more backup servers 110 need not resend.

According to one embodiment of the present invention, the one or more backup clients 100 comprises a plurality of client computers of different corporate offices. For example, the one or more backup clients 100 may comprise computers in corporate office A, computers in corporate office B, and computers in corporate office C.

According to one embodiment of the present invention, the one or more backup clients 100 comprises a plurality of client computers in a corporate office. For example, the one or more backup clients 100 may comprise computer A in a corporate office, computer B in the corporate office, and computer C in the corporate office.

According to one embodiment of the present invention, the one or more backup clients 100 comprises a client computer comprising a plurality of volumes. For example, the one or more backup clients 100 may comprise a client computer comprising volume 1, volume 2, and volume 3.

According to one embodiment of the present invention, the backup or restore operations described herein may be initiated or terminated automatically. According to another embodiment of the present invention, the backup or restore operations described herein may be initiated or terminated manually, e.g. by a user via an administrator console (102, 106).

FIG. 1B is a block diagram that illustrates an apparatus for remote office deduplication in a clustered environment in accordance with one embodiment of the present invention. According to one embodiment of the present invention, the one or more clients comprises a plurality of client computers (182, 184, 186) in a computer cluster 160. Fingerprint data is stored in one or more cluster data stores 188, which are accessible to each of the client computers (182, 184, 186) in the cluster 160. According to one embodiment of the present invention, cluster-wide checksum data 112 is stored in the one or more cluster data stores 188.

According to another embodiment of the present invention, per-volume fingerprint data is stored in the one or more cluster data stores 188. The per-volume fingerprint data may comprise a table having for each block ID and file ID combination, a fingerprint of the data at the location specified by the particular block ID and file ID combination, where one such table is associated with each volume. The tables may be stored in one of the one or more cluster data stores 188. Alternatively, the tables may be distributed across more than one of the one or more cluster data stores 188.

Backup client computers (182, 184, 186) in cluster 160 are configured to collectively manage storage and process data block requests from backup server 164. The clustered environment enables increased aggregate performance through the distribution of load across individual backup client computers (182, 184, 186); and improved resiliency through service failover between backup client computers (182, 184, 186). Cluster 160 is managed and accessed as a single system, with requests transparently distributed among the individual elements. The clustered environment virtualizes the underlying backup client computers, providing a single point of management and access.

According to one embodiment of the present invention, backup server 164 comprises a data module 152 and a network module 154, which are contained within separate housings and communicate with each other via a type of switching fabric or other communication medium. Each data module 152 is configured to manage a separate set of disks.

FIG. 2 is a flow diagram that illustrates a method for remote office deduplication backup from the perspective of a backup client in accordance with one embodiment of the present invention. The processes illustrated in FIG. 2 may be implemented in hardware, software, firmware, or a combination thereof. At 200, one or more fingerprints of one or more data blocks are calculated. For example, the one or more backup clients 100 may calculate hash values for each of the one or more data blocks. At 205, the one or more fingerprints are sent to one or more backup servers. The one or fingerprints may be sent in a single message, or in multiple messages. At 210, an indication of which data blocks corresponding to the one or more fingerprints should be sent to the one or more backup servers is received. For example, the one or more backup servers 110 may send a list of fingerprints, each fingerprint corresponding to a data block that the one or more backup clients 100 should send to the one or more backup servers 110. Alternatively, the one or more backup servers 110 may send a list of fingerprints, each fingerprint corresponding to a data block that the one or more backup servers 110 already has and which the one or more backup clients 100 need not resend. At 215, the indication is examined to determine which data blocks should be sent to the one or more backup servers. At 220, the indicated data blocks are sent to the one or more backup servers.

FIG. 3 is a flow diagram that illustrates a method for remote office deduplication backup from the perspective of a backup server in accordance with one embodiment of the present invention. The processes illustrated in FIG. 3 may be implemented in hardware, software, firmware, or a combination thereof. For example, one or more of the processes illustrated in FIG. 3 may be implemented in data module 152 of FIG. 1B. At 300, one or more data block fingerprints are received from one or more backup clients. The one or more fingerprints may be received in a single message, or in multiple messages. At 305, a determination is made regarding whether the one or more backup servers have one or more data blocks corresponding to the received one or more fingerprints. If the one or more backup servers do not have a data block corresponding to the received one or more fingerprints, an indication that the one or more backup clients should send the data block to the one or more backup servers is sent to the one or more backup clients at 310, and the data block is received at 315. Steps 305, 310, and 315 are performed for each of the one or more fingerprints received at 300.

FIG. 4 is a flow diagram that illustrates a method for remote office deduplication restore from the perspective of a backup client in accordance with one embodiment of the present invention. The processes illustrated in FIG. 4 may be implemented in hardware, software, firmware, or a combination thereof. At 400, one or more data block fingerprints from one or more backup servers are received. The one or fingerprints may be received in a single message, or in multiple messages. At 405, a determination is made regarding whether the one or more backup clients have one or more data blocks corresponding to the received one or more fingerprints. If the one or more backup clients do not have a data block corresponding to the received one or more fingerprints, an indication that the one or more backup servers should send the data block to the one or more backup clients is sent to the one or more backup servers at 410, and the data block is received at 415. Steps 405, 410, and 415 are performed for each of the one or more fingerprints received at 400.

FIG. 5 is a flow diagram that illustrates a method for remote office deduplication restore from the perspective of a backup server in accordance with one embodiment of the present invention. The processes illustrated in FIG. 5 may be implemented in hardware, software, firmware, or a combination thereof. For example, one or more of the processes illustrated in FIG. 5 may be implemented in data module 152 of FIG. 1B. At 500, one or more fingerprints of one or more data blocks are calculated. For example, the one or more backup servers 110 may calculate hash values for each of the one or more data blocks. At 505, the one or more fingerprints are sent to one or more backup clients. For example, the one or more backup servers 110 may send a list of fingerprints, each fingerprint corresponding to a data block that the one or more backup clients 100 should send to the one or more backup servers 110. Alternatively, the one or more backup servers 110 may send a list of fingerprints, each fingerprint corresponding to a data block that the one or more backup servers 110 already has and which the one or more backup clients 100 need not resend. At 510, an indication of which data blocks corresponding to the one or more fingerprints should be sent to the one or more backup clients is received. At 515, the indication is examined to determine which data blocks should be sent to the one or more backup clients. At 520, the indicated data blocks are sent to the one or more backup clients.

FIG. 6 is a block diagram that illustrates an apparatus for remote office deduplication in accordance with one embodiment of the present invention. As shown in FIG. 6, an apparatus for remote office deduplication comprises one or more backup clients 600 coupled to one or more backup servers 610 via a network 605. The one or more backup clients 600 comprise a block catalog 615 which maintains a list of fingerprints for data blocks. As shown in FIG. 6, block catalog 615 comprises, for each data block, a fingerprint 620, a block ID 625, a file ID 630, and a volume ID 635.

The one or more backup clients 600 are configured to receive a fingerprint for a data block of a first dataset and determine whether the same data block of a second dataset has been sent to one or more backup servers 610. The one or more backup clients 600 are further configured to, if the same data block of the second dataset has been sent to the one or more backup servers 610, determine the location of the data block in the second set dataset on the one or more backup servers 610, and command the one or more backup servers 610 to refer to the location of the data block in the second dataset on the one or more backup servers 610. The one or more backup clients 600 are further configured to, if the same data block of the second dataset has not been sent to the one or more backup servers 610, send the data block to the one or more backup servers 610, and record on the one or more backup clients 600, the location of the sent data block on the one or more backup servers 610.

In performing a restore operation, the one or more backup clients 600 are configured to receive a communication from the one or more backup servers 610. The one or more backup clients 600 are further configured to, if the communication comprises a mapping between a first data block in a first dataset and a second data block in a second dataset, copy the second data block in the second dataset to the first data block in the first dataset. The one or more backup clients 600 are further configured to, if the communication is a data block to be restored, copy the received data block the first data block in the first dataset. The one or more backup servers 610 are configured to receive a fingerprint for a first data block of a first dataset and determine whether the same data block of a second dataset has been sent to the one or more backup clients 600. The one or more backup servers 610 are further configured to, if it is determined that he same data block of a second dataset has been sent to the one or more backup clients 600, determine the location of the data block in the second dataset on the one or more backup clients 600, and command the one or more backup clients 600 to refer to the location of the data block in the second dataset on the one or more backup clients 600.

According to one embodiment of the present invention, the one or more backup clients 600 comprises a plurality of client computers of different corporate offices. For example, the one or more backup clients 600 may comprise computers in corporate office A, computers in corporate office B, and computers in corporate office C.

According to one embodiment of the present invention, the one or more clients 600 comprises a plurality of client computers in a corporate office. For example, the one or more backup clients 600 may comprise computer A in a corporate office, computer B in the corporate office, and computer C in the corporate office.

According to one embodiment of the present invention, the one or more clients 600 comprises a client computer comprising a plurality of volumes. For example, the one or more backup clients 600 may comprise a client computer comprising volume 1, volume 2, and volume 3.

According to one embodiment of the present invention, the one or more clients 600 comprises a plurality of client computers in a computer cluster. According to one embodiment of the present invention, per-volume fingerprint data is stored in a cluster database that is accessible to each of the client computers in the cluster. According to another embodiment of the present invention, cluster-wide fingerprint data is stored in a single table.

FIG. 7 is a flow diagram that illustrates a method for remote office deduplication backup from the perspective of a backup client in accordance with one embodiment of the present invention. The processes illustrated in FIG. 7 may be implemented in hardware, software, firmware, or a combination thereof. At 700, a fingerprint for a data block of a first dataset is received. At 705, a determination regarding whether the same data block of a second dataset has been sent to the one or more backup servers is made. For example, the one or more backup servers may calculate the fingerprint of the data block and determine whether the fingerprint is in table 615 of the one or more backup clients 600. The presence of the fingerprint in table 615 indicates the same data block of the second dataset has been sent to the one or more backup servers. If the same data block of the second dataset has been sent to the one or more backup servers, the location of the data block in the second dataset on the one or more backup servers is determined at 720 (e.g. by referencing table 615) and the one or more backup servers are commanded to refer to the location of the data block in the second dataset on the one or more backup servers at 725. The one or more backup servers may copy the data block, or create a pointer to the data block. If the same data block of the second dataset has not been sent to the backup server, the data block is sent to the one or more backup servers at 710 and the location of the sent data block on the one or more backup servers is recorded on the one or more backup clients at 715. For example, the location of the sent data block may be recorded in table 615 of the one or more backup clients 615.

FIG. 8 is a flow diagram that illustrates a method for remote office deduplication backup from the perspective of a backup server in accordance with one embodiment of the present invention. The processes illustrated in FIG. 8 may be implemented in hardware, software, firmware, or a combination thereof. For example, one or more of the processes illustrated in FIG. 8 may be implemented in data module 152 of FIG. 1B. At 800, a communication is received from one or more backup clients. At 805, a determination is made regarding whether the communication comprises a mapping between a first data block in a first dataset and a second data block in a second dataset. If the communication comprises a mapping between a first data block in a first dataset and a second data block in a second dataset, a second data block in the second dataset is copied to the first data block in the first dataset at 815. Alternatively, a pointer to the data block is created. If the communication comprises a data block to be backed up, the received data block is copied to the first data block in the first dataset at 825.

FIG. 9 is a flow diagram that illustrates a method for remote office deduplication restore from the perspective of a backup client in accordance with one embodiment of the present invention. The processes illustrated in FIG. 9 may be implemented in hardware, software, firmware, or a combination thereof. At 900, a communication is received from one or more backup servers. At 905, a determination is made regarding whether the communication comprises a mapping between a first data block in a first dataset and a second data block in a second dataset. If the communication comprises a mapping between a first data block in a first dataset and a second data block in a second dataset, a second data block in the second dataset is copied to the first data block in the first dataset at 915. Alternatively, a pointer to the data block is created. If the communication comprises a data block to be restored, the received data block is copied to the first data block in the first dataset at 925.

FIG. 10 is a flow diagram that illustrates a method for remote office deduplication restore from the perspective of a backup server in accordance with one embodiment of the present invention. The processes illustrated in FIG. 10 may be implemented in hardware, software, firmware, or a combination thereof. For example, one or more of the processes illustrated in FIG. 10 may be implemented in data module 152 of FIG. 1B. At 1000, a fingerprint for a data block of a first dataset is received. At 1005, a determination regarding whether the same data block of a second dataset has been sent to the one or more backup clients. If the same data block of the second dataset has been sent to the backup client, the location of the data block in the second dataset on the one or more backup servers is determined at 1020 and the one or more backup clients are commanded to refer to the location of the data block in the second dataset on the one or more backup clients at 1025. If the same data block of the second dataset has not been sent to the backup client, the data block is sent to the one or more backup clients at 1010 and the location of the sent data block on the one or more backup clients is recorded on the one or more backup servers at 1015.

Figure 11:
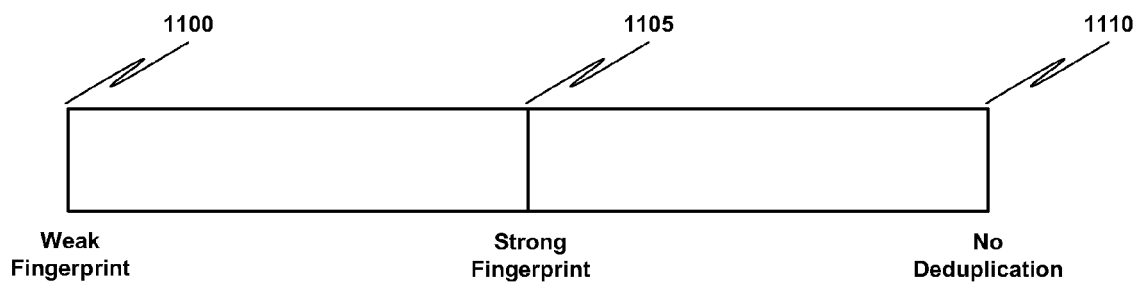
FIG. 11 is a block diagram that illustrates a continuum of deduplication strength for use in a system for remote office deduplication in accordance with one embodiment of the present invention.

FIG. 11 is a block diagram that illustrates a continuum of deduplication strength for use in a system for remote office deduplication in accordance with one embodiment of the present invention. The processes illustrated in FIG. 11 may be implemented in hardware, software, firmware, or a combination thereof. According to one embodiment of the present invention, a weak fingerprint 1100 is used for remote office deduplication. According to another embodiment of the present invention, a strong fingerprint 1110 is used for remote office deduplication. A strong fingerprint is calculated using an algorithm that is relatively less likely to result in the same fingerprint for different data blocks, as compared to an algorithm used to calculate a weak fingerprint. By way of example, a checksum will result in a relatively weak fingerprint when compared to a fingerprint calculated using the SHA-1 algorithm.

According to another embodiment of the present invention, no deduplication is used for remote office deduplication.

According to another embodiment of the present invention, the determination to use a fingerprint at all or to use a fingerprint of a particular strength is based at least in part on the importance of the data in the data block associated with the fingerprint. By way of example, assume files from a company's legal department is considered relatively more important than files from the company's finance department. In this example, one might use no deduplication for legal department files, and deduplication using a strong fingerprint for finance department files.

According to another embodiment of the present invention, the determination to use a fingerprint at all or to use a fingerprint of a particular strength is based at least in part on the file type of the file associated with the data block associated with the fingerprint. By way of example, deduplication using a weak fingerprint might be used for file extensions indicating temporary/transient data, while deduplication using a strong fingerprint might be used for file extensions not indicating temporary/transient data.

According to another embodiment of the present invention, the fingerprint associated with one or more datablocks is recalculated using a different fingerprint algorithm, based at least in part on a changed classification of the one or more data blocks.

In the context of the present disclosure, the term "deduplication rate" describes the percentage of transferred data blocks that are deduplication blocks. In other words, "deduplication rate" describes the percentage of data blocks required for a backup or restore operation that were not actually transferred over the network because the target's receipt of an associated fingerprint meant that the data block had already been transferred to the target. As the deduplication rate decreases, the savings realized by performing network deduplication also decreases. Thus, according to one embodiment of the present invention, deduplication processing is suspended if the deduplication rate falls below a predetermined threshold. While deduplication processing is disabled, the target will continue calculating the fingerprints of transferred data blocks so that the miss rate may be calculated. According to another embodiment of the present invention, deduplication processing is resumed if the deduplication rate rises above a second predetermined threshold. This is explained in more detail below with reference to FIG. 12.

Figure 12:
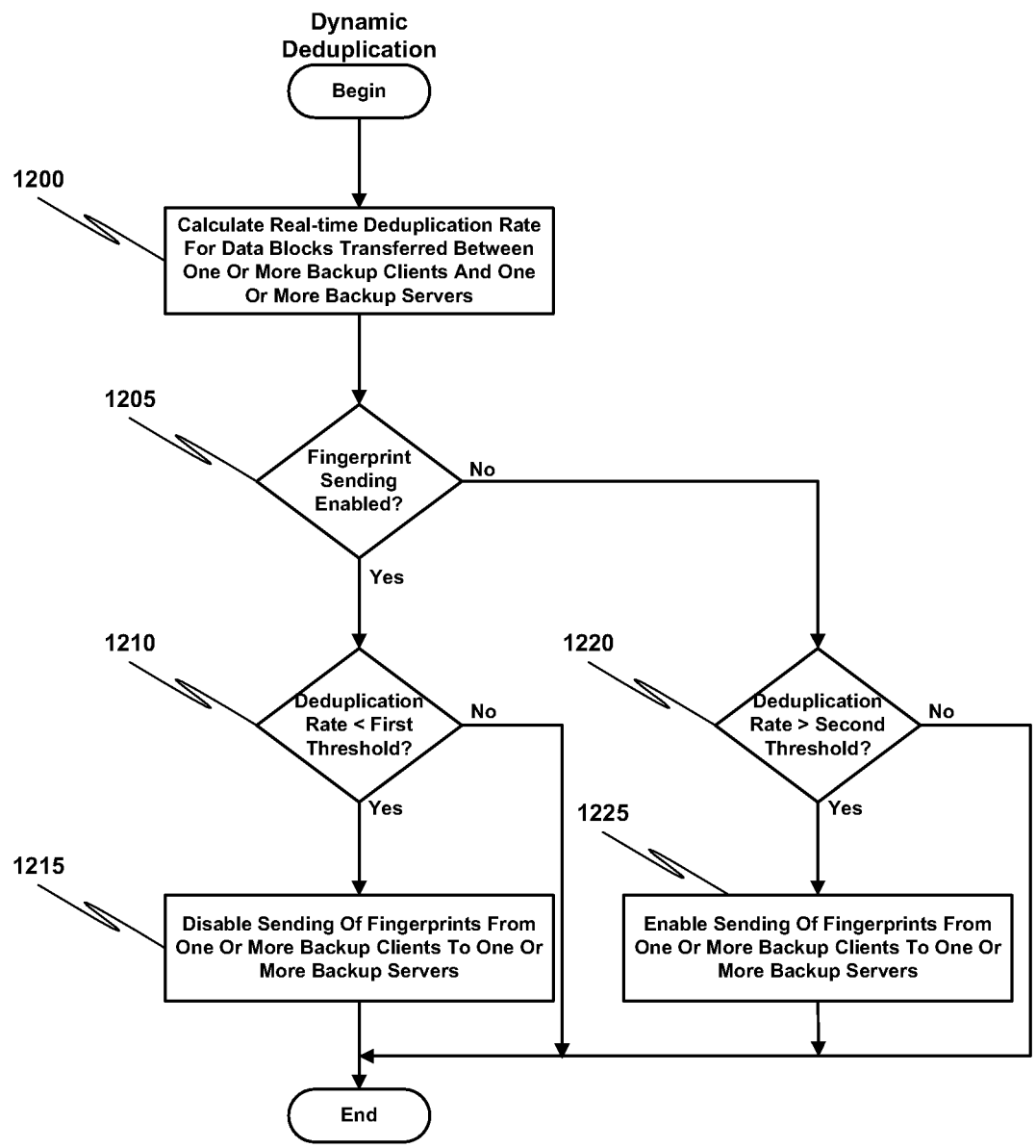
FIG. 12 is a flow diagram that illustrates a method for dynamic remote office deduplication in accordance with one embodiment of the present invention.

FIG. 12 is a flow diagram that illustrates a method for dynamic remote office deduplication in accordance with one embodiment of the present invention. The processes illustrated in FIG. 12 may be implemented in hardware, software, firmware, or a combination thereof. At 1200, the real-time deduplication rate for data blocks transferred between one or more backup clients and one or more backup servers is calculated. At 1205, a determination is made regarding whether fingerprint sending is enabled. If fingerprint sending is enabled, at 1210 a determination is made regarding whether the deduplication rate is less than a first threshold. If the deduplication rate is less than the first threshold, the sending of fingerprints from the one or more backup clients to the one or more backup servers is disabled at 1215. If at 1205 fingerprint sending is not enabled, at 1220 a determination is made regarding whether the deduplication rate is greater than a second threshold, where the second threshold is less than the first threshold. If the deduplication rate is greater than the second threshold, the sending of fingerprints from the one or more backup servers to the one or more backup clients is enabled at 1225.

If the block catalog is not refreshed in real-time, there is a possibility that the same file from different sources within a computer cluster will be transferred to the target without the benefits of deduplication. Thus, according to one embodiment of the present invention, the order of files to be transferred is randomized so that the same files are sent at different times.

Figure 13:
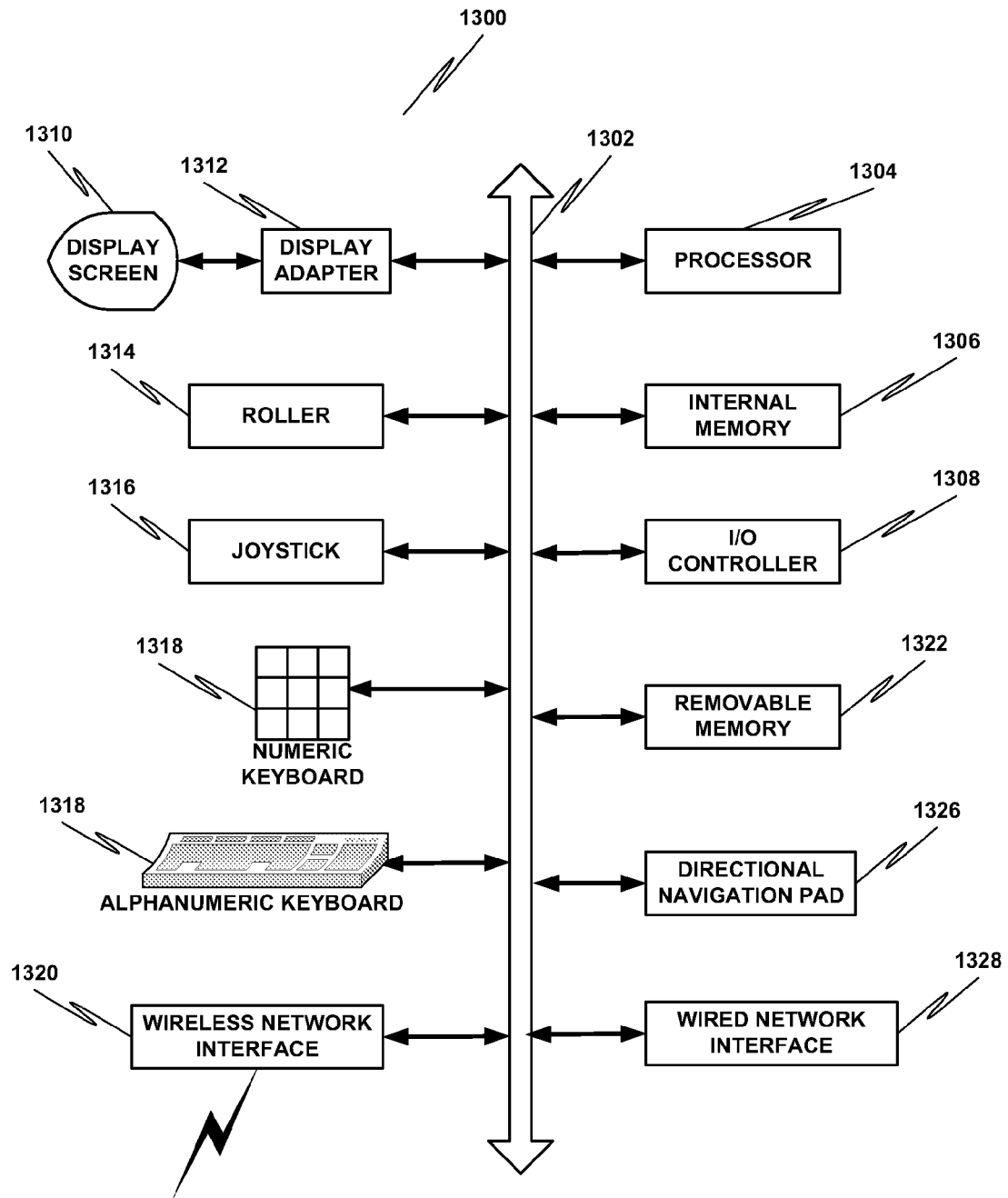
FIG. 13 is a block diagram of a computer system suitable for implementing aspects of the present invention.

FIG. 13 depicts a block diagram of a computer system 1300 suitable for implementing aspects of the present invention. As shown in FIG. 13, system 1300 includes a bus 1302 which interconnects major subsystems such as a processor 1304, an internal memory 1306 (such as a RAM), an input/output (I/O) controller 1308, a removable memory (such as a memory card) 1322, an external device such as a display screen 1310 via display adapter 1312, a roller-type input device 1314, a joystick 1316, a numeric keyboard 1318, an alphanumeric keyboard 1318, directional navigation pad 1326 and a wireless interface 1320. Many other devices can be connected. Wireless network interface 1320, wired network interface 1328, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 13 to be present to practice the present invention. Furthermore, the devices and subsystems may be interconnected in different ways from that shown in FIG. 13. Code to implement the present invention may be operably disposed in internal memory 1306 or stored on storage media such as removable memory 1322, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
    calculating a real-time deduplication rate for data blocks transferred between one or more backup clients and one or more backup servers via a network interface, the deduplication rate comprising a percentage of data blocks required for a backup operation transferred to the one or more backup servers prior to the backup operation;
    disabling the sending of fingerprints from the one or more backup clients to the one or more backup servers if the sending is currently enabled and the deduplication rate is less than a first threshold, each of the fingerprints identifying a data block and for use in determining whether the data block associated with the fingerprint should be sent to the one or more backup servers via the network; and
    enabling the sending if the sending is currently disabled and the deduplication rate is greater than a second threshold.

2. The method of claim 1, wherein the one or more backup servers comprises one or more filers.

3. The method of claim 1, wherein the fingerprint comprises:
    a hash value;
    a checksum;
    a cyclic redundancy code (CRC); or
    a message digest.

4. A method comprising:
- calculating a plurality of fingerprints of a plurality of data blocks;
- sending the plurality of fingerprints to a backup server;
- receiving from the backup server an indication of one or more selected data blocks, corresponding to one or more fingerprints, for sending to the backup server;
- sending the selected data blocks to the backup server, wherein only nonduplicative data blocks are sent to the backup server;
- calculating a deduplication rate for data blocks sent to the backup server, the deduplication rate comprising a percentage of the one or more selected data blocks that are duplicative data blocks; and
- disabling the sending of fingerprints to the backup server if the deduplication rate is less than a first threshold.

5. The method of claim 4, wherein:
a nonduplicative data block comprises a data block not previously sent to the backup server.

6. The method of claim 4, wherein:
the deduplication rate comprises a percentage of data blocks not sent to the backup server because one or more fingerprints indicated one or more data blocks associated with the one or more fingerprints were previously sent to the backup server.

7. The method of claim 4, wherein:
as the deduplication rate decreases, the storage savings of the backup server realized by performing deduplication decreases.

8. The method of claim 4, wherein a fingerprint comprises:
a hash value;
a checksum;
a cyclic redundancy code (CRC); or
a message digest.

9. The method of claim 4, further comprising:
enabling the sending of fingerprints to the backup server if the sending is currently disabled and the deduplication rate is greater than a second threshold.

10. The method of claim 4, further comprising:
at the backup server:
- determining whether any of the plurality of fingerprints is associated with a data block not already received by the backup server, the data block comprising a selected data block;
- sending an indication for one or more selected data blocks; and
- receiving and storing the one or more selected data blocks.

11. An apparatus comprising:
a memory; and
a processor configured for:
- calculating a plurality of fingerprints of a plurality of data blocks;
- sending the plurality of fingerprints to a backup server;
- receiving from the backup server an indication of one or more selected data blocks, corresponding to one or more fingerprints, for sending to the backup server;
- sending the selected data blocks to the backup server, wherein only nonduplicative data blocks are sent to the backup server;
- calculating a deduplication rate for data blocks sent to the backup server, the deduplication rate comprising a percentage of the one or more selected data blocks that are duplicative data blocks; and
- disabling the sending of fingerprints to the backup server if the deduplication rate is less than a first threshold.

12. The apparatus of claim 11, wherein:
a nonduplicative data block comprises a data block not previously sent to the backup server.

13. The apparatus of claim 11, wherein:
the deduplication rate comprises a percentage of data blocks not sent to the backup server because one or more fingerprints indicated one or more data blocks associated with the one or more fingerprints were previously sent to the backup server.

14. The apparatus of claim 11, wherein:
as the deduplication rate decreases, the storage savings of the backup server realized by performing deduplication decreases.

15. The apparatus of claim 11, wherein a fingerprint comprises:
a hash value;
a checksum;
a cyclic redundancy code (CRC); or
a message digest.

16. The apparatus of claim 11, wherein the processor is further configured for:
enabling the sending of fingerprints to the backup server if the sending is currently disabled and the deduplication rate is greater than a second threshold.

17. The apparatus of claim 11, further comprising:
the backup server configured for:
- determining whether any of the plurality of fingerprints is associated with a data block not already received by the backup server, the data block comprising a selected data block;
- sending an indication for one or more selected data blocks; and
- receiving and storing the one or more selected data blocks.

\* \* \* \* \*